(12) United States Patent
Chen

(10) Patent No.: US 7,842,210 B2
(45) Date of Patent: Nov. 30, 2010

(54) METHOD AND APPARATUS FOR BLOCKING THE ESCAPE OF FUEL VAPORS FROM A FUEL TANK

(76) Inventor: Jack Chen, 300 Windsor Dr., Oak Brook, IL (US) 60523

( * ) Notice: Subject to any disclaimer, the term of this patent is extended or adjusted under 35 U.S.C. 154(b) by 734 days.

(21) Appl. No.: 11/371,961

(22) Filed: Mar. 9, 2006

(65) Prior Publication Data

US 2007/0210486 A1   Sep. 13, 2007

(51) Int. Cl.
| | |
|---|---|
| B32B 37/00 | (2006.01) |
| B29C 67/00 | (2006.01) |
| B29C 45/14 | (2006.01) |
| A63B 37/00 | (2006.01) |

(52) U.S. Cl. .................. 264/135; 264/136; 264/139; 264/265; 264/279; 264/279.1

(58) Field of Classification Search .................. 264/134, 264/299, 279, 279.1, 135, 265, 259, 136, 264/139

See application file for complete search history.

(56) References Cited

U.S. PATENT DOCUMENTS

| | | | | |
|---|---|---|---|---|
| 4,289,924 A | * | 9/1981 | Pearce et al. ............ | 174/152 G |
| 5,075,028 A | * | 12/1991 | Hudson ................. | 252/182.14 |
| 5,170,017 A | * | 12/1992 | Stanevich et al. ....... | 174/153 G |
| 5,537,742 A | * | 7/1996 | Le et al. ................ | 29/869 |
| 5,631,445 A | * | 5/1997 | Herster ................ | 174/151 |
| 5,846,467 A | * | 12/1998 | Saito et al. ............ | 264/263 |
| 6,225,562 B1 | * | 5/2001 | Fujishita et al. ........ | 174/76 |
| 2003/0006523 A1 | * | 1/2003 | Suzuki ................. | 264/136 |
| 2006/0217491 A1 | * | 9/2006 | Higashira et al. ....... | 525/326.3 |

FOREIGN PATENT DOCUMENTS

| | | | |
|---|---|---|---|
| DE | 3903059 A1 | * | 8/1990 |
| JP | 11167834 A | * | 6/1999 |

\* cited by examiner

*Primary Examiner*—Joseph S Del Sole
*Assistant Examiner*—Ninh V Le
(74) *Attorney, Agent, or Firm*—Robert L. Marsh

(57) ABSTRACT

A grommet for sealing the wires extending through the wall of a fuel tank is formed by first removing a portion of the covering exposing the strands of wires within. A liquid sealing agent is applied to the strands and the strands are compressed to displace the strands. A hardener is then applied and then the strands are encapsulated in the body of the grommet.

11 Claims, 2 Drawing Sheets

METHOD AND APPARATUS FOR BLOCKING THE ESCAPE OF FUEL VAPORS FROM A FUEL TANK

The present invention relates to an insulated grommet for fitting in an opening in a fuel tank, the grommet having a plurality of covered electric wires passing therethrough, with each of said wires being made of a plurality of strands.

BACKGROUND OF THE INVENTION

The fuel tanks of vehicles have certain electrical apparatus therein, including a detector for detecting the volume of liquid in the tank and a pump for pumping fuel from the tank to the engine of the vehicle. Wires extend from outside the tank through an opening and into the tank to connect the electrical devices inside the tank with the apparatus of the vehicle. Each of the wires typically consists of about twenty smaller strands of copper wire wound together and surrounded by a plastic insulation layer, which is gasoline resistant. The wires passing through the walls of the tank are sealed against leakage by a grommet.

It has been found that the chemicals of a hydrocarbon fuel form a vapor which migrates between tiny gaps in the strands of wire, inside the insulating coating surrounding the wire. Regulations of the United States government prohibit virtually any leakage of fuel from the fuel tank and therefore, if wires passing through the walls of a fuel tank are not adequately sealed, the vehicle will violate government regulations.

To prevent all of the forgoing, it is desirable to provide a grommet fitted into the opening of a fuel tank that permits the wires to pass therethrough, but provides a seal to prevent gasoline vapors from migrating between the strands and outside of the tank.

SUMMARY OF THE INVENTION

Briefly, the present invention is embodied in a grommet having a body with an exterior configuration sized and shaped to seal against an opening in the fuel tank of a vehicle. The grommet has an inner end and an outer end with a plurality of stranded covered wires extending from the inner end, through the grommet and outward of the outer end. The covering is removed from a portion of the wires exposing the bundle of strands that make up each of the wires and a sealing agent permeates into the gaps between the strands and surrounds the circumference of the bundle of strands to seal the bundle against the inner surface of the body of the grommet.

To make a grommet in accordance with the invention, a portion of the covering of each of the wires that is to be enclosed within the grommet is removed exposing the individual strands. A gasoline resistant sealing agent is then applied to the surface of the exposed strands. The gaps between the strands are very small and the bundle of strands is dense, and as a result, the application of a liquid to the outer surface of the bundle will not result in the liquid permeating the bundle and wetting all the surfaces of all the strands. To facilitate this wetting of all the strands, the exposed strands, while in the presence of the liquid sealant, are displaced with respect to one another such that each of the exposed strands becomes coated with a portion of the liquefied sealing agent.

In the preferred embodiment, the bundle of strands is compressed for a short period of time between a pair of parallel spaced apart planar surfaces thereby causing the various strands to become displaced during the interval of time that the compression occurs. When the bundle is subsequently released from compression, the strands may return to their original configuration causing the strands to again displace with respect to one another and further coating the surfaces of the strands. It should be appreciated that the purpose of applying a compressive force to the bundle is to cause displacement of the strands and not to compress the strands into a single mass.

After the strands have been coated with the liquefied sealing material, the strands are treated to cause the liquefied sealing agent to harden. Where the liquefied sealing agent is in the form of a gasoline resistant liquefied polymer, the treating agent will cause the liquefied polymer to crosslink and harden into a mass that will fill the gaps between the individual strands of the bundle and will surround the exterior of the bundle. Where the liquefied sealing agent is in the form of a liquefied rubber, the strands are subjected to a vulcanizing agent to cause the liquefied rubber to solidify.

After the sealing agent has surrounded the various strands of the exposed wires and the liquefied sealing agent has been treated to cause the liquefied sealing agent to harden, the strands are then encapsulated in a hermetically sealed body that forms a portion of the grommet. Where the grommet is to be made of a plastic material formed by injecting a heated liquefied plastic material into a mold and allowing the plastic material to cool and harden, and where the treatment required to harden the liquefied sealer also requires the application of heat, the heat required to harden the sealant may at least in part be derived from the heat released in the formation of the plastic body of the grommet. Where the heat needed to form the plastic body also hardens the sealing agent, the outer surface of the bundle of strands will become securely bonded to the mass of plastic forming the body of the grommet.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENTS

Figure 1:
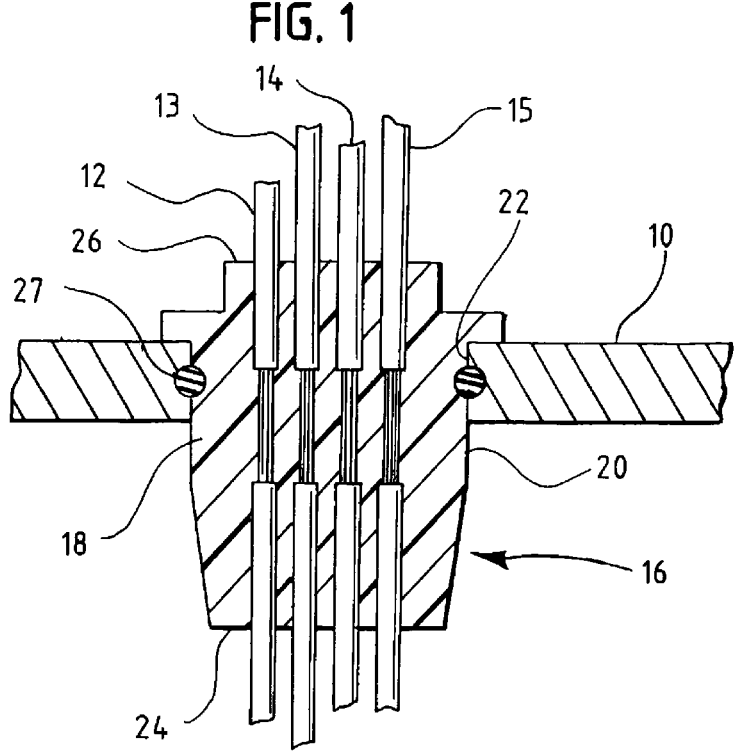
FIG. 1 is a cross-sectional view of a grommet manufactured in accordance with the method of the present invention and fitted into an opening in a fuel tank.

Referring to FIG. 1, to prevent gasoline vapors from escaping from a fuel tank 10 by migrating under a cover surrounding the strands that make up the lengths of wire 12, 13, 14, 15 that extend from inside the fuel tank 10 to an outside location, a grommet 16 manufactured in accordance with the present invention is provided. The grommet 16 has a body 18 made of a suitable gasoline resistant plastic having inner and outer surfaces 24, 26 respectively and a generally cylindrical outer wall 20 that tightly fits within a cylindrical opening 22 in the wall of the fuel tank 10. Between the cylindrical outer wall 20 of the grommet 16 and the opening 22 in the fuel tank 10 is an O-ring 27 for sealing against leakage of fuel out of the tank 10.

Figure 2:
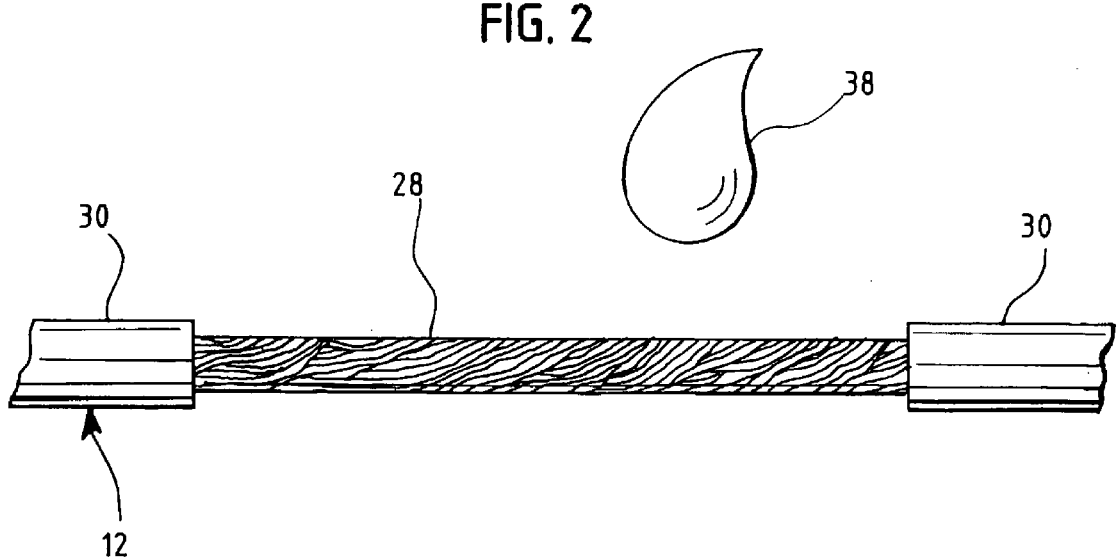
FIG. 2 is an enlarged side elevational view of one of the covered wires that pass through a grommet made in accordance with the present invention with a portion of the covering removed to expose the strands that make up the wire.
Figure 3:
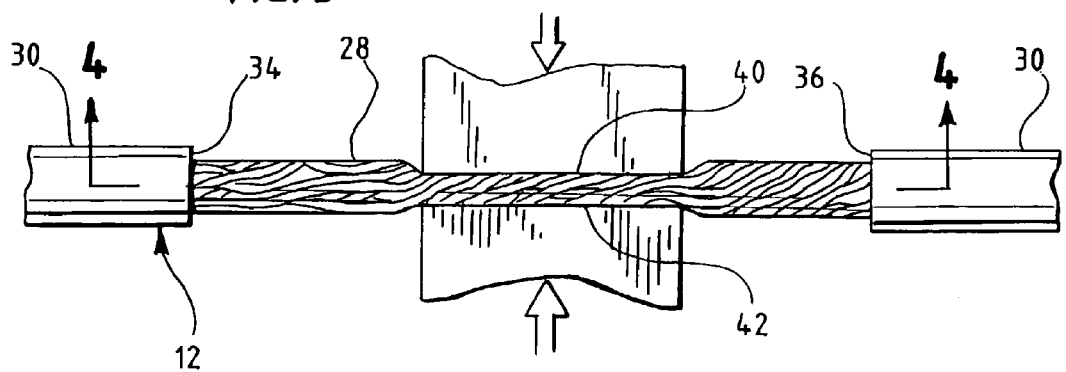
FIG. 3 is an enlarged side elevation view of a portion of the wire shown in FIG. 3 being subjected to a compressive force to displace the various strands thereof after the outer surface of the bundle has been moistened with a liquefied sealing agent.
Figure 4:
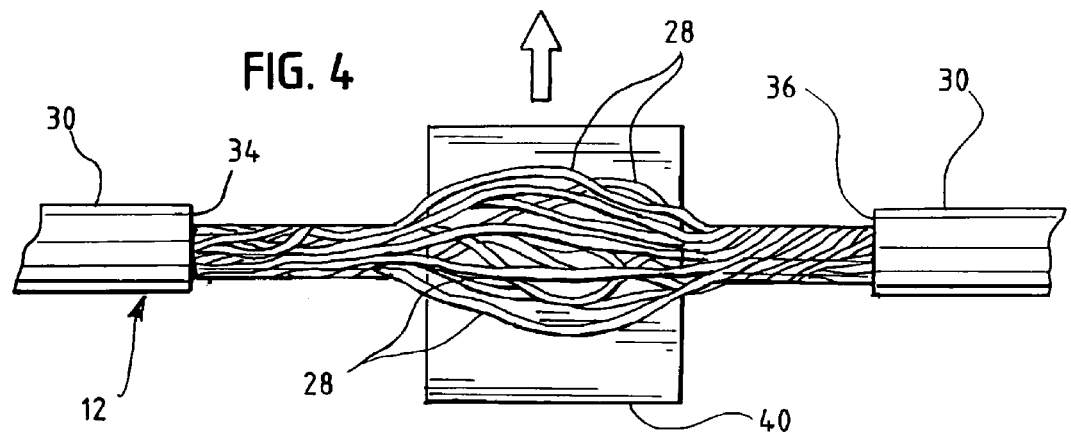
FIG. 4 is an enlarged cross-sectional view of the strands being compressed taken through lines 4-14 of FIG. 3.

Referring to FIGS. 2, 3, and 4, each of the various lengths of wire 12-15, of which wire 12 is representative of all such lengths of wire 12, 13, 14, 15, consists of a plurality of strands of copper wire with the strands wound together to form a bundle that extends through a covering 30. Each of the lengths of wire 12-15 extends into an aperture in the inner surface 24 of the grommet 16, through the body 18, and out of the outer surface 26 thereof.

To seal the various conductive strands 28-28 that make up the bundle enclosed within the covering 30, a portion of the covering 30 is removed leaving an uncovered portion 32 having a first end 34, beyond which the covering extends around the portion of the wire passing through the inner surface 24 of the grommet 16, and a second end 36 beyond which the covering extends around the portion of the wire 12 passing through the outer surface 26 of the grommet 16. To seal the various strands 28-28 so as to prevent molecules of gasoline from migrating between gaps separating adjacent strands, a small amount of liquefied sealing agent 38 is applied to the outer surface of the bundle of strands 28-28. Blended into the sealing agent 38 is a suitable curing agent that will, with the passage of time and sometimes with the application of heat, cause the liquid sealant to harden and become resistant to gasoline.

When the liquefied sealing agent 38 is first applied to the outer surface of the bundle of strands 28-28, the innermost strands may not become wetted by the liquefied sealing agent where the number of strands 28-28 that make up the wire are numerous, perhaps eight or more. To moisten the surfaces of all the strands 28-28 that make up such a bundle, the outer surface of the bundle is compressed between a pair of opposing spaced apart parallel surfaces 40, 42. The surfaces 40, 42 may be made of a suitable steel or other hard material that will not become distorted over time as pressure is applied to the strands and may have any of a number of shapes. The surfaces 40, 42 may be planar as depicted, but regardless of the shape, the surfaces must not define sharp edges that could damage one or more of the strands 28, 28. One of the wires 12 is positioned between the surfaces 40, 42 such that the wire 12 and the strands 28-28 thereof extend generally parallel to the surfaces 40, 42. In accordance with the invention, pressure is applied across of the surfaces 40, 42 to compress the strands 28-28 and cause them to become displaced with respect to one another. The displacement of the strands 28-28 causes small gaps to open between the various strands and causes the movement of one strand relative to another strand such that the liquefied sealing agent 38 is drawn between the strands and applied to the surfaces of various strands 28-28 thereby moistening them with the liquefied sealing agent.

It should be appreciated that where there are only a few strands 28-28 that make up the conductive elements of the wire, perhaps five, six, or less, it would not be necessary to displace the strands. In this case, the liquefied sealing agent will wet the strands and fill the cavities between the strands 28-28 without requiring that the strands be displaced.

In one modification of the invention, one of the planar surfaces 40 may be moved in a linear direction parallel to the second horizontal surface 42 and perpendicular to the axial length of the strands of wire 28-28, as shown in FIG. 4, while the strands are compressed to further displace the strands, if it is found that the mere compression of the strands is insufficient to moisten all of the surfaces of the strands.

It should be appreciated that it is not the intent of the compression process to distort the cross-sectional configuration of the various strands or to compress them together into a single mass because such compression could damage the strands and reduce the overall conductivity of the wire 12. It should also be appreciated that after the compression applied by the surfaces 40, 42 has been released, the wires will generally reconfigure and at least partially resume their original shape thereby causing further displacement of the strands and further contributing to the wetting of the surfaces thereof. Accordingly, once the strands 28-28 are removed from the compressive force applied by the planar surfaces 40, 42, the reconfigured strands 28-28 will be wetted throughout and a coating of sealing agent will also surround the outer circumference of the bundle.

Once the bundle of strands 28-28 has been fully wetted, the sealing agent 38 can be re-applied, if necessary, to the outer surface of the bundle of strands 28-28. The sealing agent may include one or more solvents, in which case the sealing agent should be dried in the air or heated in an oven. The dried sealing agent should then be cured, where the curing process is a crosslinking or vulcanizing process. Depending upon the kind of sealing agent employed, the curing process can be achieved by ultraviolet light, baking the strands in the oven, or curing by the heat needed to form the body of the grommet 20.

It should be appreciated that any of a number of sealing agents may be used to seal the strands 28-28 in accordance with the invention. For example, the strands may be sealed using a liquefied polymer which becomes fuel resistant when subjected to a crosslinking agent. One such liquefied polymer is sold under the trademark Kraton and manufactured by The Kraton Polymers Group of Companies. Kraton and the associated crosslink agents can be mixed and dissolved in a solvent then coated on the stripped area of the wire as described above. The coating is then dried in the air or oven and the coated wires are then baked in the oven to achieve the crosslinkage of the polymer, thereby forming a fuel resistant seal.

It should also be appreciated that certain rubbers, such as hydrogenated nitride butadiene rubber (HNBR) or NBR can be mixed with a suitable curing agent, or vulcanizing agent, and dissolved in a suitable solvent. The various strands 28-28 can then be coated with the mixture after which the coated strands are dried.

It should also be appreciated that many fluro silicones are soluble in suitable solvents such as DC730 RTV sold by Dow Corning and the Sifel series sold by Shin-Etsu. These liquids may also be used to coat and seal the strands 28-28 to form a fuel resistant seal.

In all cases, the sealing agent should be resistive to gasoline. Gasoline resistant polymers are know to swell in some measure when exposed to gasoline, but where the polymer occupies the spaces between the strands 28-28 that make up the length of wire 12, the slight expansion of the polymer will assist in further sealing the gaps between the strands and prevent the migration of molecules of gasoline from escaping the interior of the gas tank 10.

Figure 5:
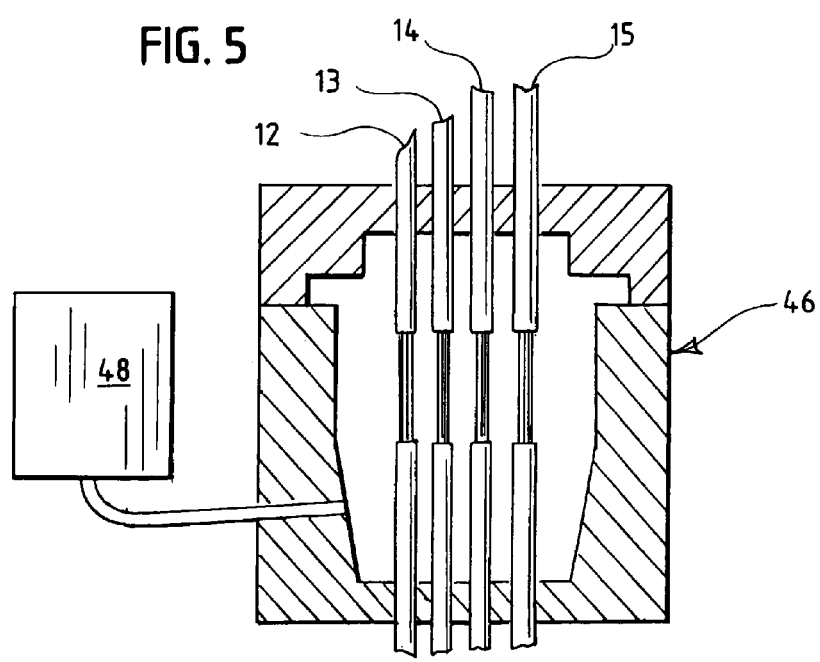
FIG. 5 is another side elevational view of the several lengths of wire such as is shown in FIG. 2 after the strands have been released from compression and returned to their original orientation and inserted into a mold for forming the body of the grommet.

Referring to FIGS. 1 and 5, after the surfaces of the various strands 28-28 have been wetted by the liquefied sealant 38, the length of wire 12 and other wires 13, 14, 15 are inserted into a mold 46, the inner surface of which is complementary to the outer shape of the grommet 16. Thereafter, the mold 46 is filled with a suitable liquefied plastic material 48 which when hardened will form the body 18 of the grommet 16. As the material 48 that forms the body 18 of the grommet 16 hardens, the plastic of the body 18 will adhere to the hardening sealant 38 that permeates the bundle of strands 28-28, further sealing the bundle against migration of gasoline molecules.

It should be appreciated that the chemistry employed to form the plastic body 18 of the grommet 16 may include the adequate applications of heat required to cause the liquefied sealing agent 38 to harden. It should also be appreciated that, certain liquefied sealing agents 38 may require only the application of heat to cause the sealing agent to harden to a solid and that a separate hardening agent, other than the application of heat, may not be required.

While the present invention has been described with respect to a single embodiment, it will be appreciated that many modifications and variations may be made without departing from the true spirit and scope of the invention. It is therefore the intent of the following claims to cover all such variations and modifications that fall within the true spirit and scope of the invention.

What is claimed is:

1. A method of making a grommet for hermetically sealing a plurality of wires extending from a first end of said grommet to a second end of said grommet wherein one of said plurality of wires is made up of a plurality of strands configured into a bundle, said method comprising the steps of removing said cover from a portion of said one of said wires exposing said strands, applying a liquefied sealing agent to an outer portion of said bundle of strands of said one of said wires, compressing said bundle of strands of said one of said wires between a pair of opposing parallel surfaces wherein said parallel surfaces are generally parallel to said one of said wires, and applying a force across said opposing surfaces to displace said strands with respect to one another, moving one of said opposing surfaces in a linear direction parallel to a second of said surfaces and perpendicular to the axial length of said strands to displace said strands wherein a surface of all said strands becomes wetted, thereafter removing said strands from said opposing parallel surfaces wherein said strands are allowed to at least partially reposition, and thereafter encapsulating said portion of said one of said wires in a hermetically sealed body of said grommet.

2. The method of claim 1 and comprising the further step of treating said coated strands to cause said liquefied sealant to harden.

3. The method of claim 2 wherein said liquefied sealing agent is a polymer.

4. The method of claim 3 and comprising the further steps of providing a mold complementary in shape to said body of said grommet, inserting said strands into said mold after said strands have been wetted with said sealing agent, inserting liquefied plastic into said mold to form said body of said grommet wherein heat from molding said plastic body hardens said sealing agent.

5. The method of claim 2 wherein said coated strands are heat treated to harden said liquefied sealant.

6. The method of claim 1 wherein said liquefied sealant is rubber and said rubber is treated with a vulcanizing agent to harden said rubber.

7. The method of claim 1 wherein said opposing surfaces are planar.

8. A method of making a grommet for hermetically sealing a plurality of covered wires extending from a first end of said grommet to a second end of said grommet wherein one of said plurality of wires is made up of a plurality of strands, said method comprising the steps of removing said cover from a portion of said one of said wires exposing said strands, applying a liquefied polymer to said exposed strands of said one of said wires, compressing said strands of said one of said wires between a pair of spaced apart parallel surfaces wherein said spaced apart parallel surfaces are generally parallel to said one of said wires, applying an external force to said spaced apart parallel surfaces to displace said strands with respect to one another, moving one of said surfaces in a linear direction parallel to a second of said parallel surfaces and perpendicular to the axial length of said strands to displace said strands wherein a surface of all of said individual strands become coated with said liquefied polymer, removing said strands of said one of said wires from between said spaced apart parallel surfaces wherein said strands are allowed to at least partially reposition, heating said strands to cause said liquefied polymer to harden, and encapsulating said portion of said one of said wires in a hermetically sealed body of said grommet.

9. The method of claim 8 wherein said strands are displaced with respect to one another before said strands are heated to harden said liquefied polymer.

10. The method of claim 8 and comprising the further steps of providing a mold complementary in shape to said body of said grommet, inserting said strands into said mold after said strands have been wetted with said liquefied polymer, inserting liquefied plastic into said mold to form said body of said grommet wherein heat from molding said plastic body hardens said liquefied polymer.

11. The method of claim 8 wherein said spaced apart parallel surfaces are planar.

* * * * *